(12) United States Patent
Nuernberger et al.

(10) Patent No.: US 9,975,438 B2
(45) Date of Patent: May 22, 2018

(54) OPERATING DEVICE AND SYSTEM FOR OPERATING A MOTOR VEHICLE

(71) Applicant: Bayerische Motoren Werke Aktiengesellschaft, Munich (DE)

(72) Inventors: Simon Nuernberger, Munich (DE); Philipp Oberhumer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days. days.

(21) Appl. No.: 15/436,024

(22) Filed: Feb. 17, 2017

(65) Prior Publication Data

US 2017/0158069 A1 Jun. 8, 2017

Related U.S. Application Data

(63) Continuation of application No. PCT/EP2015/068571, filed on Aug. 12, 2015.

(30) Foreign Application Priority Data

Aug. 19, 2014 (DE) .................... 10 2014 216 372

(51) Int. Cl.
*B60L 11/18* (2006.01)
*H01M 12/08* (2006.01)
(Continued)

(52) U.S. Cl.
CPC .............. *B60L 11/1816* (2013.01); *B60L 7/10* (2013.01); *B60L 11/187* (2013.01);
(Continued)

(58) Field of Classification Search
CPC ...... B60L 11/1816; B60L 7/10; B60L 11/187; Y02T 10/7072; Y02T 10/7011;
(Continued)

(56) References Cited

U.S. PATENT DOCUMENTS

| 3,847,671 A | 11/1974 | Leparulo et al. |
| 5,121,044 A | 6/1992 | Goldman |

(Continued)

FOREIGN PATENT DOCUMENTS

| DE | 2 417 571 A | 11/1974 |
| DE | 691 18 393 T2 | 9/1996 |

OTHER PUBLICATIONS

International Search Report (PCT/ISA/210) issued in PCT Application No. PCT/EP2015/068571 dated Oct. 28, 2015 with English translation (six pages).

(Continued)

*Primary Examiner* — Richard M Camby
(74) *Attorney, Agent, or Firm* — Crowell & Moring LLP

(57) ABSTRACT

An operating device for operating a motor vehicle has at least one solid-state gas battery that is designed to provide energy for an electric motor of the motor vehicle. In addition, the operating device has at least one high-pressure tank for receiving and storing gas for the solid-state gas battery. Furthermore, the operating device has at least one charging connection via which the solid-state gas battery can be coupled for the purposes of a charging process for receiving electrical current, and via which the high-pressure tank can be coupled for the purposes of the charging process for receiving gas.

18 Claims, 2 Drawing Sheets

(51) Int. Cl.
  *H01M 10/625* (2014.01)
  *H01M 10/663* (2014.01)
  *B60L 7/10* (2006.01)
  *H01M 8/04014* (2016.01)
  *H01M 10/46* (2006.01)
  *H01R 13/00* (2006.01)

(52) U.S. Cl.
  CPC ....... *H01M 8/04014* (2013.01); *H01M 10/46* (2013.01); *H01M 10/625* (2015.04); *H01M 10/663* (2015.04); *H01M 12/08* (2013.01); *H01R 13/005* (2013.01); *H01M 2220/20* (2013.01); *Y02E 60/128* (2013.01); *Y02T 10/7011* (2013.01); *Y02T 10/7072* (2013.01); *Y02T 90/14* (2013.01)

(58) Field of Classification Search
  CPC ...... Y02T 90/14; Y02E 60/128; H01M 12/08; H01M 10/625; H01M 10/663; H01M 8/04014; H01M 10/46; H01M 2220/20; H01R 13/005
  See application file for complete search history.

(56) References Cited

U.S. PATENT DOCUMENTS

| | | |
|---|---|---|
| 2003/0162448 A1 | 8/2003 | Routtenberg et al. |
| 2005/0031912 A1 | 2/2005 | Ovshinsky et al. |
| 2012/0041628 A1 | 2/2012 | Hermann et al. |
| 2013/0344401 A1 | 12/2013 | Albertus et al. |
| 2015/0162814 A1* | 6/2015 | Davis .................... H02K 53/00 307/10.1 |
| 2015/0251544 A1* | 9/2015 | Sugiyama ................ B60L 1/00 307/10.6 |

OTHER PUBLICATIONS

German-language Written Opinion (PCT/ISA/237) issued in PCT Application No. PCT/EP2015/068571 dated Oct. 28, 2015 (eight pages).

German Search Report issued in counterpart German Application No. 10 2014 216 372.2 dated Apr. 10, 2015 with partial English translation (13 pages).

* cited by examiner

OPERATING DEVICE AND SYSTEM FOR OPERATING A MOTOR VEHICLE

CROSS REFERENCE TO RELATED APPLICATIONS

This application is a continuation of PCT International Application No. PCT/EP2015/068571, filed Aug. 12, 2015, which claims priority under 35 U.S.C. § 119 from German Patent Application No. 10 2014 216 372.2, filed Aug. 19, 2014, the entire disclosures of which are herein expressly incorporated by reference.

This application contains subject matter related to U.S. application Ser. No. 15/436,069, entitled "Charging Device and System for Charging a Motor Vehicle" filed on even date herewith.

BACKGROUND AND SUMMARY OF THE INVENTION

The present invention relates to an operating device and a system for operating a motor vehicle, which operating device and system are suitable for operating a motor vehicle with a solid-gas battery.

Motor vehicles with electric motors are an alternative to motor vehicles with conventional drive by way of internal combustion engines. An advantage of electric motors is the local absence of emissions with regard to pollutant emissions. The drive energy of an electric motor is generally provided by way of rechargeable accumulators. In this context, as accumulators, use is often made of lithium-ion batteries which impart the required drive energy for the operation of the motor vehicle.

Alternatives to lithium-ion batteries are, for example, lithium-air batteries or lithium-oxygen batteries or, more generally, solid-gas batteries, which have for example a considerably greater theoretical energy density and power capacity than present lithium-ion batteries, which can have an advantageous effect inter alia on a possible range of the motor vehicle. As a result, for motor vehicles with solid-gas batteries, special charging devices are also required, which provide the motor vehicle with the required fuel for the operation of the solid-gas battery.

The document US 2012/0041628 A1 describes a system and a method suitable for electrically charging a metal-air battery arranged in a motor vehicle. For this purpose, there are also arranged in the motor vehicle a compressor and a tank which, together with an external power source, permit a charging cycle of the metal-air battery.

An object on which the invention is based is that of providing an operating device and a system which are suitable for permitting efficient operation of a motor vehicle with solid-gas battery.

The object is achieved by way an operating element and a system in accordance with embodiments of the invention.

According to a first aspect of the invention, an operating device for operating a motor vehicle includes at least one solid-gas battery, which is designed to provide energy for an electric motor of the motor vehicle. Furthermore, the operating device includes at least one high-pressure tank for receiving and storing gas for the solid-gas battery. Furthermore, the operating device has at least one charging connection, by way of which the solid-gas battery can be coupled, during the course of a charging process, so as to receive electrical current and by way of which the high-pressure tank can be coupled, during the course of the charging process, so as to receive gas.

In this way, an operating device is realized which permits efficient operation of a motor vehicle with solid-gas battery. The solid-gas battery of the motor vehicle provides inter alia electrical energy for the drive of the motor vehicle, which electrical energy is for example converted by the electric motor of the motor vehicle into mechanical energy and thus permits propulsion of the motor vehicle. In this context, the gas that is required for the operation of the solid-gas battery is supplied to the solid-gas battery from the high-pressure tank of the motor vehicle. During the course of a charging process, it is for example possible for new gas to be supplied to the high-pressure tank of the motor vehicle by way of a charging device designed for the purpose, in order to thus permit, for example, further driving cycles.

Solid-gas batteries have an anode, which is composed of a solid, and a cathode, which is spaced apart from said anode and which is composed for example of mesoporous carbon and which may figuratively be viewed as a type of foam. Between the solid anode and the cathode, there is typically situated an electrolyte which, depending on the embodiment of the solid-gas battery, may for example be in solid or liquid form. By way of a supply of gas, a current flow is induced in the solid-gas battery, which current flow can be utilized for the purposes of supplying energy for an external electrical circuit. It is basically the case, during discharging of the solid-gas battery, that positive ions and electrodes are detached from the solid anode and pass over into the electrolyte or into the external electrical circuit. During the further process, the positive ions become coupled, at the cathode, to atoms or molecules of the supplied gas and to the electrons of the external electrical circuit, and are electrochemically bonded there. The electrons that are moved through the external electrical circuit in this process constitute the current flow, and realize an electrical supply to components coupled to the solid-gas battery. If, for example, an external voltage potential is applied to the solid-gas battery, which voltage potential exceeds the potential during the discharging of the solid-gas battery, the described process is reversed, and the solid-gas battery is charged. In this case, the electrochemical bonds between the ions of the solid anode and the atoms or molecules of the supplied gas are severed again. As a result, the ions travel through the electrolyte to the solid anode and set down on the latter by way of recombination with electrons from the external electrical circuit. Furthermore, the electrochemically bonded gas is emitted again, which gas is for example released into an exterior region of the motor vehicle or can be recirculated into the motor vehicle for a further cycle of the solid-gas battery.

In the context of the invention, the motor vehicle has at least one solid-gas battery. It is however also possible for multiple solid-gas batteries to be arranged in the motor vehicle, which solid-gas batteries are for example coupled to one another and thus realize a battery pack which provides the required drive energy for the electric motor of the motor vehicle.

In the interaction of the described operating device with a corresponding charging device, it is possible for the motor vehicle to be supplied with electrical current and/or gas for the solid-gas battery. The charging device then has, for example, a supply connection which can be coupled to the at least one charging connection of the motor vehicle and which, during the course of the charging process, permits charging with electrical current and gas.

By way of the charging device, it is the case inter alia that an electrical current is provided via the supply connection, which electrical current permits charging of the solid-gas battery. It is preferable for direct current to be provided by the charging device, because this permits a faster charging process of the motor vehicle than charging with alternating current. Charging with alternating current is however likewise possible, such that, in this context, it is for example the case that the charging device or the motor vehicle includes components for current and/or voltage conversion, such as for example a rectifier. In this way, it is ensured that the solid-gas battery of the motor vehicle is supplied with direct current which is required for the charging of the solid-gas battery. Analogously to direct current or alternating current, it is also possible by way of the charging device and the supply connection for a direct-current voltage or an alternating-current voltage to be applied, in order to thereby permit electrical charging of the solid-gas battery during the course of a charging process.

The gas that is emitted during the course of the charging process may for example be released from the solid-gas battery or from the motor vehicle, or said gas is reused for a further driving cycle of the solid-gas battery. In this case, the emitted gas is for example released from a housing of the solid-gas battery and received by the charging device, such that the charging device, during the further process, supplies the gas, for example in treated and/or compressed form, back to the high-pressure tank of the motor vehicle.

In the case of the gas being supplied in compressed form to the motor vehicle during the course of the charging process, it is possible for a greater gas volume to be stored, for example in the high-pressure tank of the motor vehicle, than would be the case with non-compressed gas. To compress the gas, it is for example the case that a compressor is integrated in the charging device, such that, during the course of the charging process, the gas can be supplied under pressure to the motor vehicle and stored in the high-pressure tank. For example, for operation of the solid-gas battery, gas is stored at a pressure of 300 bar to 700 bar in the high-pressure tank of the motor vehicle in order that, in this way, an adequate gas quantity is carried on board the motor vehicle and a desired range of the motor vehicle is thus made possible.

By virtue of the compressor being arranged externally with respect to the motor vehicle, this has an advantageous effect on the power efficiency of the solid-gas battery, because in this way, motor vehicles can be realized in which weight, volume and costs that would be involved in the case of a compressor being installed in the motor vehicle can be eliminated.

In the case of motor vehicles which do not have a dedicated compressor on board, it is for example possible, as a result of the elimination of the additional weight and volume of the compressor, to reduce the consumption of the vehicle and of the energy provided by the solid-gas battery. Furthermore, a simple and compact design is made possible, which can contribute to an inexpensive construction of the motor vehicle with solid-gas battery.

By virtue of a compressor for compressing the gas for the solid-gas battery of the motor vehicle being arranged in a charging device and not in the motor vehicle itself, a weight and volume reduction of the motor vehicle is made possible, which in turn makes it possible to realize an adaptation of further components of the motor vehicle, such as for example of the high-pressure tank. On this basis, said high-pressure tank can be made larger in terms of its dimensions than would be possible in the case of a motor vehicle with compressor. In this way, it is likewise possible, for example, for the solid-gas battery to be made larger than in the case of a motor vehicle with compressor. An enlargement of the geometrical form of the solid-gas battery and/or of the high-pressure tank increases inter alia the power capacity of the solid-gas battery and/or a gas volume that can be stored in the high-pressure tank. These geometrical adaptations can furthermore have an advantageous effect on the possible range of the motor vehicle. Consequently, the arrangement of the compressor in a charging device external to the motor vehicle contributes to more efficient operation of the solid-gas battery.

During the course of the charging process of the motor vehicle, it is also possible for emitted gas to be released from the motor vehicle via the charging connection and supplied, for example, to a charging device in order for new gas to be drawn from the charging station during the further process. A reason for this may be that a user of the motor vehicle seeks to exchange the previously used gas for a different gas type or gas mixture in order to thereby for example increase the efficiency of the solid-gas battery and the possible range of the motor vehicle. In this context, the motor vehicle and the charging device are correspondingly designed to perform such a gas exchange during the course of the charging process. Furthermore, in such a case, the solid-gas battery is designed to be operated using different gas types or gas mixtures. For example, the charging device includes a gas supply unit which has multiple gas tanks with different gas types for solid-gas batteries and provides these for the charging process of the motor vehicle. Alternatively or in addition, such a gas supply unit is also coupled to a gas supply network, and draws one or more gas types and/or gas mixtures therefrom for supply to the motor vehicle.

The charging with electrical current and gas for the solid-gas battery may for example take place simultaneously or in temporal succession during the course of the charging process by way of the charging connection of the motor vehicle. The at least one charging connection is in this case designed correspondingly for this purpose, and is coupled to the high-pressure tank and to the solid-gas battery. For example, the at least one charging connection includes an insulated electrical line for receiving and supplying the electrical current for the solid-gas battery, which insulated electrical line is surrounded by a gas line for receiving and supplying the gas for the high-pressure tank. During the course of the charging process, it is for example also possible for gas to be received from the motor vehicle via said gas line, which gas is for example emitted during the charging of the solid-gas battery. Alternatively, the operating device also includes, for this purpose, a further gas line which is for example also couplable to the charging device by way of the at least one charging connection. The at least one charging connection is, in this context, realized for example as a type of combination connection, which is thus designed so as to permit at least the described functions.

Alternatively or in addition, the described operating device has further charging connections such that, during the course of the charging process, it is for example the case that a first charging connection is available for receiving electrical current and a second charging connection is available for receiving gas for the solid-gas battery. Here, the second charging connection may also be designed for the release of gas from the motor vehicle, or it is for example the case that a gas release connection is provided which performs said function. The one or more charging connections are, in this context, designed so as to have for example common connector shapes in accordance with their function. They may however also be designed differently in terms of their shape such that, during the course of the charging process, it is at least the case that charging with electrical current and/or gas for the solid-gas battery is possible at all times.

In a refinement of the first aspect, the solid-gas battery of the motor vehicle is a metal-air battery.

The solid-gas battery or metal-air battery is for example designed to be operated with treated and/or synthetic air and/or pure oxygen, wherein, in the case of the energy being provided by way of the solid-gas battery, substantially the oxygen components of the respective gas type are electrochemically bonded during operation of the solid-gas battery. Excess nitrogen is then for example released from the motor vehicle in order to allow the oxygen to continue to pass to the reactive centers of the cathode of the solid-gas battery.

In this context, treated air refers to air without water and carbon dioxides or at least with only small fractions of water and carbon dioxides, which adversely influence the operation of the solid-gas battery even in the range from 100 to 400 ppm, and which can permanently damage the solid-gas battery. Furthermore, in the treated air, it may also be the case that further constituents have been filtered out. Synthetic air refers to a mixture of oxygen and nitrogen.

In a further refinement of the first aspect, the metal-air battery is a lithium-air battery.

In a further refinement of the first aspect, the metal-air battery is a lithium-oxygen battery.

In this context, lithium-air batteries constitute a preferred embodiment of solid-gas batteries and metal-air batteries. However, other metal-air batteries, such as for example zinc-air batteries, are also possible as a component of the operating device for the operation of the motor vehicle.

In a further refinement of the first aspect, the operating device includes an auxiliary energy store which is designed to receive and release energy.

The auxiliary energy store is for example realized as a lithium-ion accumulator, and, in combination with the solid-gas battery of the motor vehicle, constitutes a dual-store concept. The solid-gas battery represents for example a main energy store, such that the auxiliary energy store can be referred to as a secondary energy store.

For example, the auxiliary energy store is realized as one or more lithium-ion cells, or supercapacitors or hybrid capacitors are used to store additional energy and provide said energy as required. Hybrid capacitors are in this case a mixture of supercapacitors and lithium-ion cells. The auxiliary energy store may however also be assembled from multiple components which enable electrical energy to be received and output.

By comparison with the solid-gas battery of the motor vehicle, the energy content of the auxiliary energy store may be small and, for example, provide energy which corresponds to a useful power of 1-2 kWh. The stored energy from the auxiliary energy store may then for example be output in addition to the energy provided by the solid-gas battery, in order thereby to realize, for example, a performance boost of the electric motor which is required for example during an acceleration process.

In a further refinement of the first aspect, the electric motor is designed such that, during operation of the motor vehicle, during a recuperation phase, said electric motor, as a generator, converts mechanical energy into electrical energy.

In this context, the recuperation phase denotes a phase during which charging of the solid-gas battery is possible during operation of the motor vehicle. For example, received kinetic energy of the motor vehicle is, during a braking process, converted again into electrical energy, or in relation to time electrical power, by way of the electric motor by generator action, which electrical power can be supplied for example to the above-described auxiliary energy store.

Alternatively or in addition, the electrical energy thus generated is utilized for charging the solid-gas battery. Electrical charging of the solid-gas battery leads to a release of the electrochemically bonded gas, which can then in turn be utilized for example for renewed discharging of the solid-gas battery. Here, the solid-gas battery is for example surrounded by a battery housing which is designed to receive a certain gas volume in a manner dependent on a gas pressure. If the gas pressure within the battery housing exceeds, for example, a predefined threshold value, gas can be released from the battery housing for example via a pressure-limiting valve.

In a further refinement of the first aspect, the operating device includes a gas store which is designed to receive and release gas from the solid-gas battery.

Alternatively or in addition to the battery housing which can receive gas, a gas store is coupled to the solid-gas battery and receives emitted gas during the recuperation phase. For example, the gas store and/or the battery housing can receive a gas pressure of 5 bar before gas is for example released from the motor vehicle to the surroundings. During the further process, the stored gas can be supplied to the solid-gas battery again if said solid-gas battery requires gas for operational reasons. Consequently, the gas store and/or the battery housing are conducive to efficient utilization of the gas available for the operation of the solid-gas battery, without it being imperatively necessary for gas to be drawn only from the high-pressure tank of the motor vehicle.

In a further refinement of the first aspect, the operating device has a feed line which couples the high-pressure tank to the solid-gas battery. Furthermore, the operating device includes an air-conditioning system which is designed to at least partially control the temperature of the solid-gas battery and/or of the high-pressure tank and/or of the feed line.

By way of the air-conditioning system of the operating device, it is possible for the gas for the solid-gas battery to be temperature-controlled to a temperature which is advantageous for example in conjunction with the operation of the solid-gas battery and the motor vehicle. For example, by way of the air-conditioning system, a predefined temperature range of the stored gas in the high-pressure tank is maintained, which temperature range permits optimum operation of the solid-gas battery of the motor vehicle within a short time.

Gas which is drawn from a charging device during the course of the charging process can also be temperature-controlled by way of the air-conditioning system if the supplied gas has for example not already been temperature-controlled as desired by way of the charging device. The energy required for the temperature control of the gas may for example be drawn from the charging device during the course of the charging process by way of the at least one charging connection of the motor vehicle. In this way, it is for example the case that no energy is required from the solid-gas battery or from the auxiliary energy store, which is possibly conducive to a charging process coming to an end more quickly.

Depending on ambient temperatures, the gas is for example heated in the feed line before being conducted into the solid-gas battery. Alternatively, the gas in the high-pressure tank is cooled if, for example, ambient temperatures prevail which exceed an optimum operating temperature of the solid-gas battery.

Based on the Joule-Thomson effect, it is known that compressed gas cools when it expands. Consequently, it is thus possible for the compressed gas, for example from the high-pressure tank of the motor vehicle, to also contribute to cooling of the solid-gas battery. Here, the gas pressure of the stored gas must at least be higher than the gas pressure in the battery housing of the solid-gas battery in order that the gas to be supplied can propagate in the direction of the solid-gas battery.

In a further refinement of the first aspect, the operating device includes a gas release unit which is designed to release gas during operation or during the course of the charging process of the motor vehicle.

In this way, an exchange of gas for the solid-gas battery is made possible for example during the course of the charging process by way of a charging device. If the solid-gas battery is for example designed to be operated with synthetic air and pure oxygen, the gas types can be released and exchanged as required during the course of the charging process.

Furthermore, by way of the gas release unit, it is also possible during the course of the charging process for the emitted gas, which as a result of the operation during the discharging of the solid-gas battery was electrochemically bonded to the positive ions of the solid on the cathode, to be released and, for example during the course of the charging process, to be supplied to a gas-receiving unit of the charging device and to be supplied, having been compressed again, to the high-pressure tank of the motor vehicle. Here, the gas is for example conducted via pipelines from the solid-gas battery to the at least one charging connection of the motor vehicle, and during the course of the charging process, is received by a supply connection, which is coupled to the charging connection, of the charging device.

In a further refinement of the first aspect, the operating device has an electrical charging unit which is arranged in the motor vehicle and which comprises a rectifier.

During the course of a charging process, it is preferably the case that direct current or direct-current voltage is drawn by way of a charging device, whereby, in general, it is made possible to realize a charging process of the motor vehicle which comes to an end more quickly than a charging process using alternating current or alternating-current voltage. Charging using alternating current or alternating-current voltage is however likewise possible, such that the motor vehicle comprises the charging unit, which, for example by way of the rectifier, permits simple current or voltage conversion. In this way, it is ensured that the solid-gas battery of the motor vehicle is supplied with direct current or direct-current voltage is applied to the solid-gas battery, which direct current or direct-current voltage is required for the charging of the solid-gas battery.

In a further refinement of the first aspect, the operating device has a communication interface which is designed to, during the course of the charging process of the motor vehicle, exchange signals for the control of the charging process between the motor vehicle and a charging device designed for the purpose.

By way of the communication interface, it is possible for the operating device to communicate with the charging device and thus control the charging process of the motor vehicle. In this context, the charging device is, for example, equipped with a corresponding communication interface which permits such communication. For example, the communication is controlled by way of a vehicle or battery management system of the motor vehicle, which monitors inter alia the charging process. Here, the communication includes a transmission of various items of information, such as for example a status of the charging process, a system pressure, an oxygen content of the supplied gas, a fill level of the high-pressure tank, a pressure in the solid-gas battery, a gas temperature, or a battery temperature. The operating device is furthermore designed to determine the items of information and measurement values required for the communication, and can for example monitor the charging process by way of various sensors.

Owing to the communication between the operating device of the motor vehicle and the charging device, an optimum and reliable charging process for the solid-gas battery is made possible.

In a further refinement of the first aspect, the operating device has a control unit which is designed to control the operation and/or charging process of the motor vehicle.

The control unit includes for example the above-described vehicle or battery management system and, aside from the communication during the course of the charging process, also controls the discharging of the solid-gas battery and the operation of the motor vehicle.

In this context, by way of the control unit, it is for example the case that the gas pressure, an oxygen content of the gas and an exhaust-gas temperature are monitored, and for example an analysis of exhaust air, such as for example the gas released from the motor vehicle, is performed, and furthermore, a thermal management system is controlled, which thermal management system controls for example the air-conditioning system and the temperature control of the gas. For this purpose, the control unit is coupled, at least for signal transmission, to various sensors and/or the described components of the motor vehicle.

According to a second aspect, a system for operating a motor vehicle includes an operating device according to one of the above-described refinements of the first aspect and a charging device which has at least one supply connection for the supply of electrical current and/or gas for the solid-gas battery during the course of the charging process of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of identical construction or function are denoted by the same reference designations throughout the figures.

Figure 1:
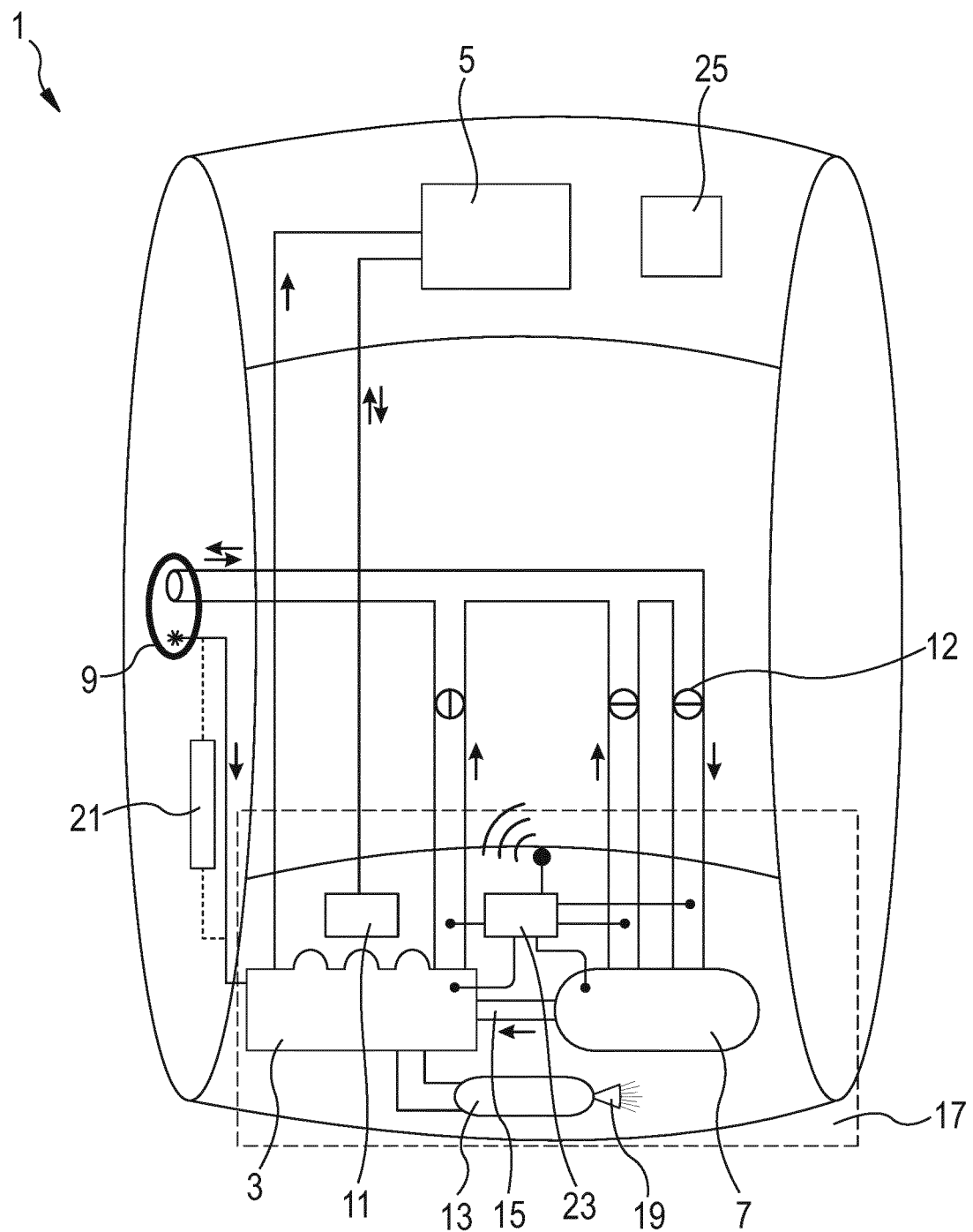
FIG. 1 is a schematic diagram of an exemplary embodiment of an operating device for operating a motor vehicle.

FIG. 1 illustrates an exemplary embodiment of an operating device for operating a motor vehicle 1 which has a solid-gas battery 3, an electric motor 5 and a high-pressure tank 7. The solid-gas battery 3 is coupled to the high-pressure tank 7 by way of a feed line 15, and provides inter alia electrical energy for the drive of the motor vehicle 1, which electrical energy is, during operation of the motor vehicle 1, converted by the electric motor 5 into mechanical energy, with propulsion of the motor vehicle 1 thus being made possible. In this context, the gas required for the operation of the solid-gas battery 3 is supplied to the solid-gas battery 3 from the high-pressure tank 7 of the motor vehicle 1. During the course of a charging process, it is for example possible for new gas to be supplied to the high-pressure tank 7 of the motor vehicle 1 by way of a charging device 30 designed for this purpose, for example for the purposes of permitting further driving cycles.

Furthermore, the motor vehicle 1 has at least one charging connection 9 by way of which the solid-gas battery 3 can be coupled, during the course of a charging process, so as to receive electrical current and by way of which the high-pressure tank 7 can be coupled, during the course of the charging process, so as to receive gas. In this exemplary embodiment, the charging connection 9 is coupled to the solid-gas battery 3 by way of an electrical line and by way of one or more pipelines in order to permit charging with electrical current and allow gas to be received from the solid-gas battery 3. Furthermore, the at least one charging connection 9 is coupled to the high-pressure tank 7 by way of one or more pipelines in order to make it possible for gas to be received by and released from the high-pressure tank.

Solid-gas batteries 3 are an alternative to, for example, known lithium-ion batteries, and offer a considerably greater theoretical energy density and power capacity in relation thereto, which can have an advantageous effect inter alia on a possible range of the motor vehicle 1. A subset of solid-gas batteries 3 are metal-air batteries, and specific examples in the context are lithium-air batteries and lithium-oxygen batteries.

Solid-gas batteries 3 have an anode, which is composed of a solid, and a cathode, which is spaced apart from said anode. By way of a supply of gas, a current flow is induced in the solid-gas battery 3, which current flow can be utilized for the purposes of supplying energy in the motor vehicle 1. In this way, it is possible inter alia for the electric motor 5 of the motor vehicle 1 to be driven, which electric motor converts the electrical energy of the solid-gas battery 3 into mechanical power and thereby permits propulsion of the motor vehicle 1. This consequently leads to a discharge of the solid-gas battery 3, in the case of which atoms or molecules of the gas electrochemically bond, at the cathode, with positive ions originating from the anode.

To recharge the solid-gas battery 3, during the course of the charging process, the motor vehicle 1 is coupled for example by way of the at least one charging connection 9 to at least one supply connection 31 of a charging device 30, which is designed to supply the motor vehicle 1 with electrical current and/or gas for the solid-gas battery 3.

During the course of the charging process, direct current is preferably drawn from the charging device 30, or direct-current voltage is applied, because this permits a faster charging process than charging with alternating current or alternating-current voltage. Charging with alternating current or alternating-current voltage is however likewise possible, such that, in this context, the motor vehicle 1 includes for example a charging unit 21 for current or voltage conversion, which charging unit has for example a rectifier. In this way, it is ensured that the solid-gas battery 3 is supplied with direct current, or direct-current voltage is applied to the solid-gas battery 3, which direct current or direct-current voltage is required for the charging of the solid-gas battery 3.

The charging with electrical current and gas for the solid-gas battery 3 may, during the course of the charging process, take place for example simultaneously or else temporally in succession. The at least one charging connection 9 is in this case designed correspondingly, and in this exemplary embodiment is realized as a type of combination connection. Alternatively, multiple charging connections 9 are formed by way of which electrical current is received and gas is received and/or released from the motor vehicle 1.

A throughflow and a direction of the propagating gas in the one or more pipelines may be controlled for example by way of valves 12 which, in FIG. 1, are arranged by way of example at various positions in the motor vehicle 1. Here, median lines in the symbols of the valves 12 indicate whether the valves 12 are oriented in a blocking direction or in a pass-through direction. A blocking direction of a valve 12 is illustrated by virtue of the median line in the symbols of the valves 12 being drawn transversely with respect to the pipe walls of the respective pipeline of the pipeline system. Furthermore, independently of the orientation of the valves 12, arrows at the pipelines indicate the direction in which a gas flow will preferentially take place. Double arrows indicate that a gas flow is possible in both illustrated directions. Furthermore, the motor vehicle 1 has an auxiliary energy store 11 which is electrically coupled at least to the electric motor 5. The auxiliary energy store 11 is realized for example as a lithium-ion accumulator and, in combination with the solid-gas battery 3 of the motor vehicle 1, constitutes a dual-store concept. The solid-gas battery 3 represents for example a main energy store, such that the auxiliary energy store 11 can also be referred to as a secondary energy store.

For example, the auxiliary energy store 11 is realized as one or more lithium-ion cells, or supercapacitors or hybrid capacitors are used to store additional energy and provide said energy as required.

Hybrid capacitors are in this case a mixture of supercapacitors and lithium-ion cells. The auxiliary energy store 11 may however also be assembled from multiple components which enable electrical energy to be received and output.

By comparison with the solid-gas battery 3 of the motor vehicle 1, the energy content of the auxiliary energy store may be small and, for example, provide energy which corresponds to a useful power of 1-2 kWh. The stored energy from the auxiliary energy store 11 may then for example be output in addition to the energy provided by the solid-gas battery 3, in order thereby to realize, for example, a performance boost of the electric motor 5 which is required for example during an acceleration process.

The electric motor 5 is furthermore designed to generate electrical power by generator action during a recuperation phase. In this context, the recuperation phase denotes a phase during which charging of the solid-gas battery 3 is possible during operation of the motor vehicle 1. For example, received kinetic energy of the motor vehicle 1 is, during a braking process, converted again into electrical energy, or in relation to time electrical power, by way of the electric motor 5 by generator action, which electrical power can be supplied for example to the auxiliary energy store 11.

Alternatively or in addition, the electrical energy thus generated is utilized for charging the solid-gas battery 3. Electrical charging of the solid-gas battery 3 leads to a release of the electrochemically bonded gas, which can then in turn be utilized for example for renewed discharging of the solid-gas battery 3. Here, the solid-gas battery 3 is for example surrounded by a battery housing which is designed to receive a certain gas volume in a manner dependent on a gas pressure. If the gas pressure within the battery housing exceeds, for example, a predefined threshold value, gas can be released from the battery housing for example via a pressure-limiting valve, or said gas is supplied to an additional gas store 13 of the motor vehicle 1.

The gas store 13 is coupled to the solid-gas battery 3 and receives for example emitted gas during the recuperation phase. For example, the gas store 13 and/or the battery housing can receive a gas pressure of 5 bar before gas is for example released from the motor vehicle to the surroundings. The release of gas from the motor vehicle 1 is, in this exemplary embodiment, illustrated by way of a gas release unit 19 on the gas store 13, and is realized for example in the form of a pressure-limiting valve.

Furthermore, the exemplary embodiment of the operating device in FIG. 1 has a communication interface 23 in or on the motor vehicle 1, by way of which communication interface it is possible to communicate with the charging device 30 and thus control the charging process of the motor vehicle 1. In this context, the charging device 30 is for example equipped with a corresponding communication interface 43 which permits such communication. For example, in this way, a vehicle or battery management system of the motor vehicle 1 is controlled, which monitors inter alia the charging process. Here, the communication includes a transmission of various items of information, such as for example a status of the charging process, a system pressure, an oxygen content of the supplied gas, a fill level of the high-pressure tank, a pressure in the solid-gas battery, a gas temperature, a battery temperature. The motor vehicle 1 is furthermore designed to determine the items of information and measurement values required for the communication, and can for example monitor the charging process by way of various sensors. This is indicated in FIG. 1 by way of lines which lead away from the communication interface 23 of the motor vehicle 1 and which end, by way of example, in the pipelines, in the high-pressure tank 7 and in the solid-gas battery 3. For example, at the indicated positions, there are arranged sensors which allow measurement values to be received, which measurement values are for example transmitted, for evaluation, to a control unit 25 of the motor vehicle 1, which can influence the charging process of the motor vehicle 1 in targeted fashion.

The control unit 25 includes for example the abovementioned vehicle or battery management system, and controls not only the communication during the course of the charging process but also the discharging of the solid-gas battery 3 and the operation of the motor vehicle 1. Here, the control unit 25 includes for example a processing unit and a data and program memory, and is coupled in terms of signal transmission to sensors and/or to the described components of the motor vehicle 1 which permit the charging process and/or the operation of the motor vehicle 1. Here, the processing unit and/or the data and program memory may be formed in one structural unit or may be distributed between two or more structural units.

In this context, by way of the control unit 25, it is for example the case that the gas pressure, an oxygen content of the gas and an exhaust gas temperature are monitored, and for example an analysis of exhaust air, for example the gas released from the motor vehicle, is performed, and for example an air-conditioning system 17 of the motor vehicle 1 and the temperature control of the gas are controlled.

Figure 2:
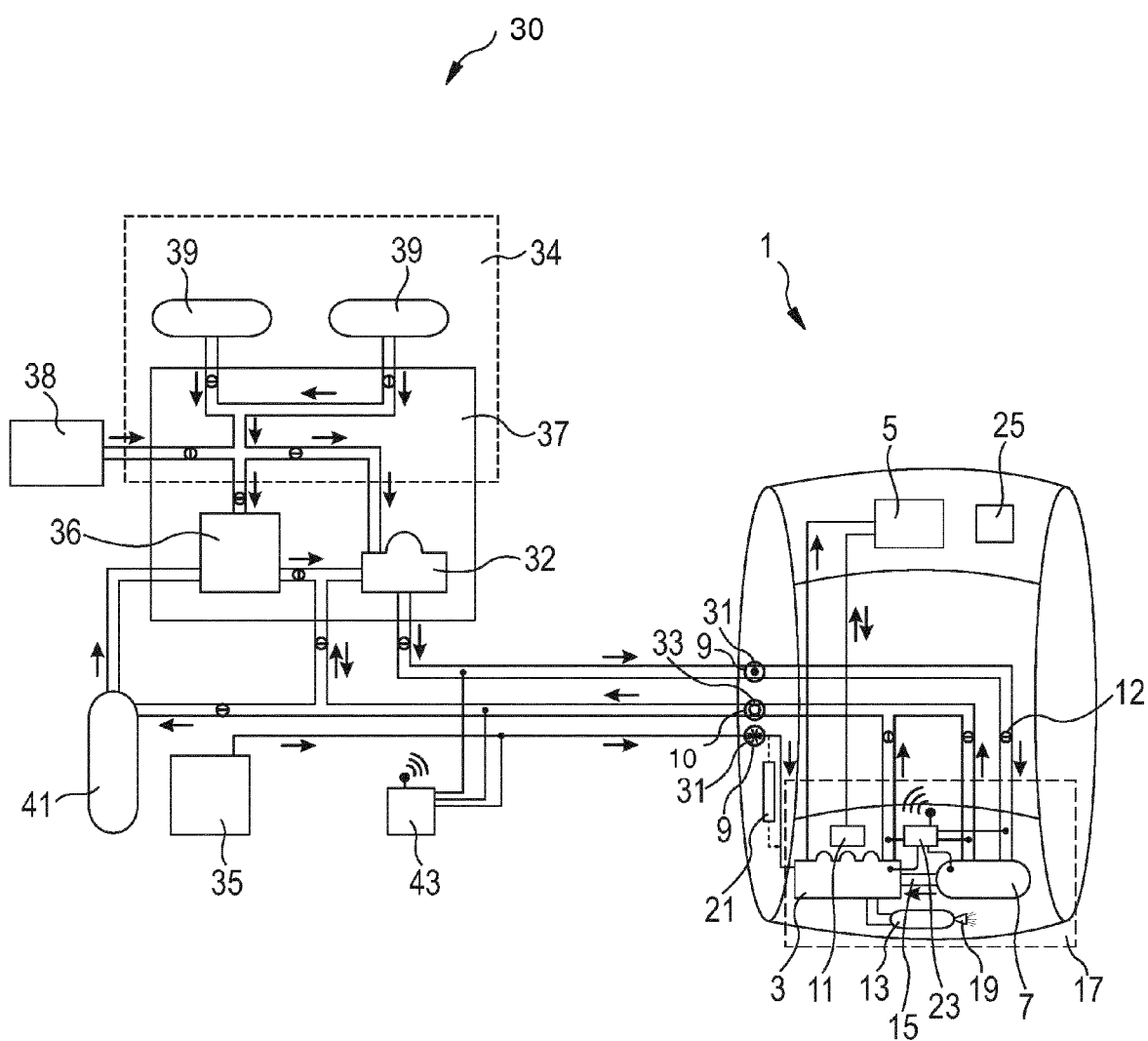
FIG. 2 is a schematic diagram of a system for operating a motor vehicle.

FIG. 2 illustrates a system for the charging of the motor vehicle 1, which includes an exemplary embodiment of a charging device 30 and the motor vehicle 1. The motor vehicle 1 substantially corresponds, in terms of embodiment, to the motor vehicle 1 of the exemplary embodiment from FIG. 1, with the difference that, in FIG. 2, three charging connections 9 of the operating device are illustrated, which, separately from one another, permit the charging with electrical current and/or gas and the receiving of gas from the motor vehicle 1 during the course of the charging process.

The charging device 30 correspondingly has three complementary connections which, during the course of the charging process, are coupled to the respective associated charging connection 9 of the motor vehicle 1. Here, a first supply connection 31 of the charging device 30 for the charging with gas is coupled to a first charging connection 9, a second supply connection 31 for the charging with electrical current is coupled to a second charging connection 9, and a gas-receiving connection 33 of the charging device 30 for receiving gas is coupled to a gas release connection 10 of the motor vehicle 1.

The first charging connection 9 is coupled to the high-pressure tank 7 of the motor vehicle 1 by way of a pipeline, and allows gas which is provided, and supplied during the course of the charging process, by the charging device 30 to be received. The second charging connection 9 is coupled to the solid-gas battery 3, and supplies electrical current to the latter during the course of the charging process, which consequently leads to charging of the solid-gas battery 3. The gas release connection 10 is coupled to the high-pressure tank 7 and to the solid-gas battery 3 and thus makes it possible for a gas type previously introduced into the tank to be exchanged, and/or for the gas emitted during the charging process to be recirculated for example out of a battery housing of the solid-gas battery 3. Here, the gas is received for example by a gas-receiving unit 41 of the charging device 1, in the further process is for example purified by way of a gas treatment unit 36 for removal of harmful constituents, and is supplied to the motor vehicle 1 again. The charging connections 9 are for example designed so as to have at least the common connector shapes in accordance with their function. They may however also be designed differently in terms of their embodiment such that, during the course of the charging process, it is at least the case that charging with electrical current and/or gas for the solid-gas battery 3 of the motor vehicle 1 is possible at all times.

The charging device 30 thus permits charging with electrical current and/or gas for motor vehicles 1 which have at least one solid-gas battery 3. The charging device 30 has an energy supply unit 35 and a gas supply unit 37, which are arranged externally with respect to the motor vehicle 1 and which provide the electrical current and gas for a charging process of the motor vehicle 1.

The charging process of the motor vehicle 1 is realized by way of the two supply connections 31 and by way of the gas-receiving connection 33, which are coupled to the energy supply unit 35 and to the gas supply unit 37. In this exemplary embodiment, the gas supply unit 37 is coupled to the respective connections by way of a pipeline system, and the energy supply unit 35 is coupled to the respective connections by way of an electrical line. A throughflow and a direction of the propagating gas in the pipeline system may be controlled for example by way of further valves 12.

The energy supply unit 35 is for example a separate component of the charging device 30, which includes for example a generator, and/or said energy supply unit is coupled to an energy supply network from which it draws the electrical current required for the charging of the motor vehicle 1. It is preferable for direct current or direct-current voltage to be provided by the energy supply unit 35, because this permits a faster charging process than charging with alternating current or alternating-current voltage. Charging with alternating current or alternating-current voltage is however likewise possible, such that, in this context, it is for example the case that the charging device 30 comprises components for current and/or voltage conversion. In this exemplary embodiment, the gas supply unit 37 of the charging device 30 is coupled to two gas tanks 39 in which different gas types for the solid-gas battery 3 are stored, which gas types are provided by said gas supply unit for the charging process of the motor vehicle 1. For example, the solid-gas battery 3 is designed to be operated with synthetic air or pure oxygen, such that the gas supply unit 37 permits charging with different gas types during the course of the charging process. Alternatively or in addition, the gas supply unit 37 is also coupled to a gas supply network and, from the latter, draws one or more gas types for supply to the motor vehicle 1 during the course of the charging process. In FIG. 2, the gas supply unit 37 is, by way of example, coupled to an external gas reservoir 38 which ensures a gas supply additionally to the two illustrated gas tanks 39.

During charging of the solid-gas battery 3, the energy supply unit 35 supplies electrical current to the solid-gas battery 3 during the course of the charging process, which electrical current substantially represents an external voltage potential which is applied to the solid-gas battery 3. The discharging process is substantially reversed, and the solid-gas battery 3 is charged. During the charging, the electrochemical bonds between the ions of the solid anode and the atoms or molecules of the supplied gas are severed again. As a result, the electrochemically bonded gas is emitted again and can be released into an exterior region of the motor vehicle 1 or recirculated into the motor vehicle 1 again for a further cycle of the solid-gas battery 3.

For this purpose, it is for example the case that the gas-receiving connection 33 is arranged on the charging device 30, which gas-receiving connection makes it possible for gas to be received from the motor vehicle 1 during the course of a charging process. Alternatively, the at least one supply connection 31 is additionally designed to receive gas from the motor vehicle 1 during the course of the charging process.

A reason for an exchange of gas may for example be that a user of the motor vehicle 1 seeks to exchange the previously used gas for a different gas type in order to thereby for example increase the efficiency of the solid-gas battery 3 during operation and the possible range of the motor vehicle 1. For example, the charging device 30 includes a gas-receiving unit 41 which, during the course of the charging process, receives gas from the motor vehicle 1 by way of the gas-receiving connection 33, in order to store said gas for example in a gas tank. For example, an exchange of the gas for the solid-gas battery 3 is made possible in this way. It is thus possible, for example, for synthetic air which has previously been introduced into and which is for example stored in the high-pressure tank 7 of the motor vehicle 1 to be exchanged for pure oxygen, which possibly permits greater efficiency, and thus a greater range of the motor vehicle 1, in relation to the synthetic air during operation of the solid-gas battery 3.

Furthermore, by way of the gas-receiving unit 41, it is also possible during the course of the charging process for the emitted gas, which as a result of the operation during the discharging of the solid-gas battery 3 was electrochemically bonded, at the cathode, to the positive ions that have passed over from the solid anode into the electrolyte, to be received and supplied again to the high-pressure tank 7 of the motor vehicle 1.

The charging device 30 of the exemplary embodiment in FIG. 2 furthermore includes a compressor 32 and an air-conditioning system 34. Furthermore, the gas supply unit 37 has a gas treatment unit 36, by way of which gas can be treated, which gas is provided to the motor vehicle 1 for the solid-gas battery 3. The gas treatment unit 36 is, in the exemplary embodiment described here, coupled to the gas-receiving unit 41, to the gas reservoir 38 and to the two gas tanks 39 and to the compressor 32. In this way, it is for example possible for harmful constituents of the gas to be filtered out, regardless of where the gas supply unit 37 draws gas from for the charging process. By way of the gas treatment unit 36, the gas is consequently purified before being supplied, during the course of the charging process, to the motor vehicle 1 for the solid-gas battery 3.

For example, the gas can thus, by way of the gas treatment unit 36, be substantially purified for removal of water and carbon dioxides, which adversely influence the operation of the solid-gas battery 3 even in the range from for example 100 to 400 ppm, and which can permanently damage the solid-gas battery 3. Other contaminants, such as for example particles and/or hydrocarbons, may also be separated out in this way, such that the treated gas is subsequently supplied to the motor vehicle 1 or is stored for example for a later charging process.

This is conducive to achieving a longer service life of the solid-gas battery 3 of the motor vehicle 1 and delaying a time for maintenance of the solid-gas battery 3 of the motor vehicle 1.

The gas for the solid-gas battery 3 may also be supplied to the motor vehicle 1 under pressure during the course of the charging process. In this case, the gas is compressed by way of the compressor 32 before being supplied to the high-pressure tank 7 of the motor vehicle 1 during the course of the charging process.

A possible pressure range assumed by the gas in compressed form in the high-pressure tank 7 is between 300 bar and 700 bar. Other pressure ranges are however likewise possible. By virtue of the fact that, during the course of the charging process, the gas is supplied in compressed form to the motor vehicle 1, it is possible to store a greater gas volume for example in the high-pressure tank 7 of the motor vehicle 1, which can have an advantageous effect on the power capacity of the solid-gas battery 3 and on the possible range of the motor vehicle 1.

The compressor 32 is for example integrated, as a component of the gas supply unit 37, in the charging device 30, and arranged externally with respect to the motor vehicle 1. This permits charging with and storage of compressed gas for motor vehicles 1 which themselves do not have an on-board compressor 32. In this way, it is possible to realize motor vehicles 1 with solid-gas batteries 3 in which weight, volume and costs that would be involved in the case of a compressor 32 being installed in the motor vehicle 1 can be eliminated. The weight reduction of the motor vehicle 1 made possible by way of the described charging device 30 has an advantageous effect on the energy density and the power capacity of the solid-gas battery 3, and, by way of the associated volume reduction, permits an adaptation of other components of the motor vehicle 1, such as for example of the high-pressure tank 7. On this basis, said high-pressure tank can be made larger in terms of its dimensions than would be possible in the case of a motor vehicle 1 with compressor 32. Consequently, the arrangement of the compressor 32 in the charging device 30 and externally with respect to the motor vehicle 1 contributes to more efficient operation of the solid-gas battery 3.

Furthermore, the compressor 32 can also be made larger in terms of its construction than would be possible in the case of a mobile compressor in the motor vehicle 1. This can also have an advantageous effect on the charging process of the motor vehicle 1, because, in the case of a functionally identical basic concept, small compressors generally exhibit lower efficiency than compressors of larger form. Consequently, in this way, faster charging with gas during the course of the charging process is possible.

By way of the air-conditioning system 34 of the charging device 30, it is possible for the gas to be temperature-controlled, for and/or during the charging process, to a temperature which permits for example fast and/or battery-preserving charging of the motor vehicle 1. For example, by way of the air-conditioning system 34, a certain temperature range of the gas provided by the gas supply unit 37 is maintained, which temperature range realizes optimum operation of the solid-gas battery 3 of the motor vehicle 1 within a short time. For example, it is also the case that one of the two gas tanks 39 is a cryogenic store which is cooled by way of the air-conditioning system 34 and which permits for example charging with liquid oxygen for the motor vehicle 1. In this exemplary embodiment, the air-conditioning system 34 includes the two gas tanks 39 and a part of a pipeline system which couples the gas-conducting components of the charging device 30 to one another. It is however alternatively or additionally possible to realize a situation in which the gas-receiving unit 41, the gas treatment unit 36 and other components of the charging device 30 are temperature-controlled and integrated into the area of influence of the air-conditioning system 34.

By virtue of the fact that the air-conditioning system 34 of the charging device 30 already provides for example cooled gas for a charging process of the motor vehicle 1, the use of the air-conditioning system 17 of the motor vehicle 1 is possibly not necessary, or is at least necessary only to a limited extent, such that correspondingly, less energy outlay is required on the part of the motor vehicle 1 for example during operation.

Furthermore, the exemplary embodiment of the charging device 30 in FIG. 2 has the above-described communication interface 43 by way of which it is possible to communicate with the motor vehicle 1 and thus control the charging process of the motor vehicle 1. For this purpose, the motor vehicle 1 is inter alia equipped with the communication interface 23, which permits such communication.

Owing to the communication between the charging device 30 and the motor vehicle 1, an optimum and reliable process of charging with electrical current and/or gas for the solid-gas battery 3 is consequently made possible. The described charging device 30 may for example be realized similarly to known refueling stations for motor vehicles with internal combustion engines in the public infrastructure, though may also be implemented privately for non-commercial purposes. If the charging device 30 is for example implemented at a domestic address of a user, the charging device 30 may in this context also be referred to as a private charging station, and additionally also permits charging of solid-gas batteries which supply electrical energy to components which are arranged for example in a domestic residence of the user and which do not belong to the motor vehicle 1.

LIST OF REFERENCE DESIGNATIONS

1 Motor vehicle
3 Solid-gas battery
5 Electric motor
7 High-pressure tank
9 Charging connection
10 Gas release connection
11 Auxiliary energy store
12 Valves
13 Gas store
15 Feed line
17 Air-conditioning system
19 Gas release unit
21 Charging unit
23 Communication interface
25 Control unit
30 Charging device
31 Supply connection
32 Compressor
33 Gas-receiving connection
34 Air-conditioning system of charging device
35 Energy supply unit
36 Gas treatment unit
37 Gas supply unit
38 Gas reservoir
39 Gas tank
41 Gas-receiving unit
43 Communication interface of charging device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating device for operating a motor vehicle having an electric motor, comprising:
   at least one solid-gas battery which is configured to provide energy for the electric motor of the motor vehicle;
   at least one high-pressure tank that receives and stores gas for the solid-gas battery; and
   at least one charging connection by way of which the solid-gas battery is coupleable, during the course of a charging process, so as to receive electrical current and by way of which the high-pressure tank is coupleable, during the course of the charging process, so as to receive the gas from a charging station by way of the at least one charging connection.

2. The operating device according to claim 1, wherein the solid-gas battery is a metal-air battery.

3. The operating device according to claim 2, wherein the metal-air battery is a lithium-air battery and/or a lithium-oxygen battery.

4. The operating device according to claim 1, further comprising:
   an auxiliary energy store which is configured to receive and release energy.

5. The operating device according to claim 1, wherein the electric motor is designed such that, during operation of the motor vehicle, during a recuperation phase, said electric motor, as a generator, converts mechanical energy into electrical energy.

6. The operating device according to claim 1, further comprising:
   a gas store which is configured to receive and release gas from the solid-gas battery.

7. The operating device according to claim 4, further comprising:
   a gas store which is configured to receive and release gas from the solid-gas battery.

8. The operating device according to claim 1, further comprising:

a feed line which couples the high-pressure tank to the solid-gas battery; and an air-conditioning system which is configured to at least partially control temperature of the solid-gas battery, of the high-pressure tank and/or of the feed line.

9. The operating device according to claim 7, further comprising:

a feed line which couples the high-pressure tank to the solid-gas battery; and an air-conditioning system which is configured to at least partially control temperature of the solid-gas battery, of the high-pressure tank and/or of the feed line.

10. The operating device according to claim 1, further comprising:

a gas release unit which is configured to release gas during operation or during the course of the charging process of the motor vehicle.

11. The operating device according to claim 9, further comprising:

a gas release unit which is configured to release gas during operation or during the course of the charging process of the motor vehicle.

12. The operating device according to claim 1, further comprising:

an electrical charging unit which is arranged in the motor vehicle and which comprises a rectifier.

13. The operating device according to claim 11, further comprising:

an electrical charging unit which is arranged in the motor vehicle and which comprises a rectifier.

14. The operating device according to claim 1, further comprising:

a communication interface which is designed to, during the course of the charging process of the motor vehicle, exchange signals for control of the charging process between the motor vehicle and the charging station.

15. The operating device according to claim 13, further comprising:

a communication interface which is designed to, during the course of the charging process of the motor vehicle, exchange signals for control of the charging process between the motor vehicle and the charging station.

16. The operating device according to claim 1, further comprising:

a control unit that controls the operation and/or the charging process of the motor vehicle.

17. The operating device according to claim 15, further comprising:

a control unit that controls the operation and/or the charging process of the motor vehicle.

18. A system for operating a motor vehicle, comprising:
an operating device according to claim 1; and
the charging station which has at least one supply connection for the supply of electrical current and/or gas for the solid-gas battery during the course of the charging process of the motor vehicle.

* * * * *